United States Patent
Dickens et al.

(10) Patent No.: US 8,762,503 B2
(45) Date of Patent: *Jun. 24, 2014

(54) BEST PRACTICES ANALYSIS OF ZONES AND COMPONENTS IN A NETWORK

(71) Applicant: International Business Machines Corporation, Armonk, NY (US)

(72) Inventors: Louie A. Dickens, Tucson, AZ (US); Olive P. Faries, Tucson, AZ (US); Laurence W. Holley, Tucson, AZ (US); Sheri L. Jackson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/762,944

(22) Filed: Feb. 8, 2013

(65) Prior Publication Data
US 2013/0159481 A1 Jun. 20, 2013

Related U.S. Application Data

(63) Continuation of application No. 13/230,692, filed on Sep. 12, 2011.

(51) Int. Cl.
*G06F 15/177* (2006.01)

(52) U.S. Cl.
USPC ............ 709/221; 709/224; 709/200; 707/708

(58) Field of Classification Search
USPC ............ 709/220, 224, 221, 223, 20; 707/708
See application file for complete search history.

(56) References Cited

U.S. PATENT DOCUMENTS

| | | | |
|---|---|---|---|
| 7,685,261 B1 | 3/2010 | Marinelli et al. | |
| 7,685,277 B2 | 3/2010 | Butler et al. | |
| 8,005,803 B2 | 8/2011 | Graefe et al. | |
| 2005/0055309 A1 | 3/2005 | Williams et al. | |
| 2009/0094664 A1* | 4/2009 | Butler et al. | 726/1 |
| 2009/0187533 A1 | 7/2009 | Butler et al. | |
| 2010/0251252 A1 | 9/2010 | Laverone et al. | |

OTHER PUBLICATIONS

Office Action dated May 22, 2013, pp. 1-22, for U.S. Appl. No. 13/230,692, filed Sep. 12, 2011 by inventors L. A. Dickens, et al. (18.418).

Response dated Aug. 22, 2013, pp. 1-12, to Office Action dated May 22, 2013, pp. 1-22, for U.S. Appl. No. 13/230,692, filed Sep. 12, 2011 by inventors L. A. Dickens, et al. (18.418).

(Continued)

*Primary Examiner* — El Hadji Sall
(74) *Attorney, Agent, or Firm* — Konrad Raynes Davda & Victor LLP; David W. Victor

(57) ABSTRACT

Provided is a method for best practices analysis of zones and components in a network. A database has information on components in the network and configuration settings for the components. Best practices rules indicate best practices configuration settings for components in the network. The database and the accessed best practices rules are processed to determine whether the configuration settings for the components in the network satisfy the best practices configuration settings for the components indicated in the best practices rules. A report is generated indicating whether the configuration settings of the components in the network satisfy the best practices configuration settings for the components indicated in the best practices rules.

14 Claims, 9 Drawing Sheets

(56) References Cited

OTHER PUBLICATIONS

P. Mell, "The NIST Definition of Cloud Computing (Draft)", National Institute of Standards and Technology, Special Publication 800-145 (draft), Jan. 2011, pp. 1-7.

Preliminary Amendment for U.S. Appl. No. 13/230,692, filed Feb. 8, 2013, 10 pp. [18.418 (PrelimAmend)].

U.S. Appl. No. 13/230,692, entitled "Best Practices Analysis of Zones and Components in a Network", filed Sep. 12, 2011, invented by L.A. Dickens et al., 40 pp. [18.418 (Appln)].

Notice of Allowance dated Sep. 24, 2013, pp. 1-22, for U.S. Appl. No. 13/230,692, filed Sep. 12, 2011 by inventors L. A. Dickens, et al. (18.418).

* cited by examiner

BEST PRACTICES ANALYSIS OF ZONES AND COMPONENTS IN A NETWORK

RELATED APPLICATIONS

This patent application is a continuation of U.S. patent application Ser. No. 13/230,692, filed on Sep. 12, 2011, which patent application is incorporated herein by reference in its entirety.

BACKGROUND OF THE INVENTION

1. Field of the Invention

The present invention relates to a computer program product, system, and method for best practices analysis of zones and components in a network.

2. Description of the Related Art

As the number of users of networks, such as Local Area Networks (LAN) and Storage Area Networks (SAN) increase, the number of components and switches in the networks increase to support the growing number of network users. Further, many networks are comprised of components from different vendors having different configuration requirements. This complicates network management because vendors are continually changing the best practices configuration settings for their components deployed in a network. Further, network administrators have to make sure their components comply with vendor specified best practices for configuration settings. This task of compliance is made difficult by a combination of the myriad of different best practices configuration settings provided by different vendors for their components and the numerous components deployed in a network. Cloud computing which provides for massive networks of components and users further complicates network management issues.

There is a need in the art for improved techniques for managing configurations of networks.

SUMMARY

Provided are a computer program product, system, and method for best practices analysis of zones and components in a network. A database has information on components in the network and configuration settings for the components. Best practices rules indicate best practices configuration settings for components in the network. The database and the accessed best practices rules are processed to determine whether the configuration settings for the components in the network satisfy the best practices configuration settings for the components indicated in the best practices rules. A report is generated indicating whether the configuration settings of the components in the network satisfy the best practices configuration settings for the components indicated in the best practices rules.

DETAILED DESCRIPTION

Described embodiments provide techniques for discovering components and zones in a network and their configuration settings and then applying best practices rules to determine whether configuration settings for the zones and components in the network follow best practices configuration settings of applicable best practices rules. Described embodiments automatically determine whether the configuration of components and zones in the network satisfy the most relevant best practices. This allows the system administrator to ensure that the components and zones follow the most relevant best practices to avoid network problems and errors that may result when the network configuration deviates from vendor and industry standard best practices. Further, the described embodiments allow for consideration of vendor specific best practices rules, including rules from multiple vendors when components in the network are from multiple vendors, to ensure compliance with all known rules.

Figure 1:
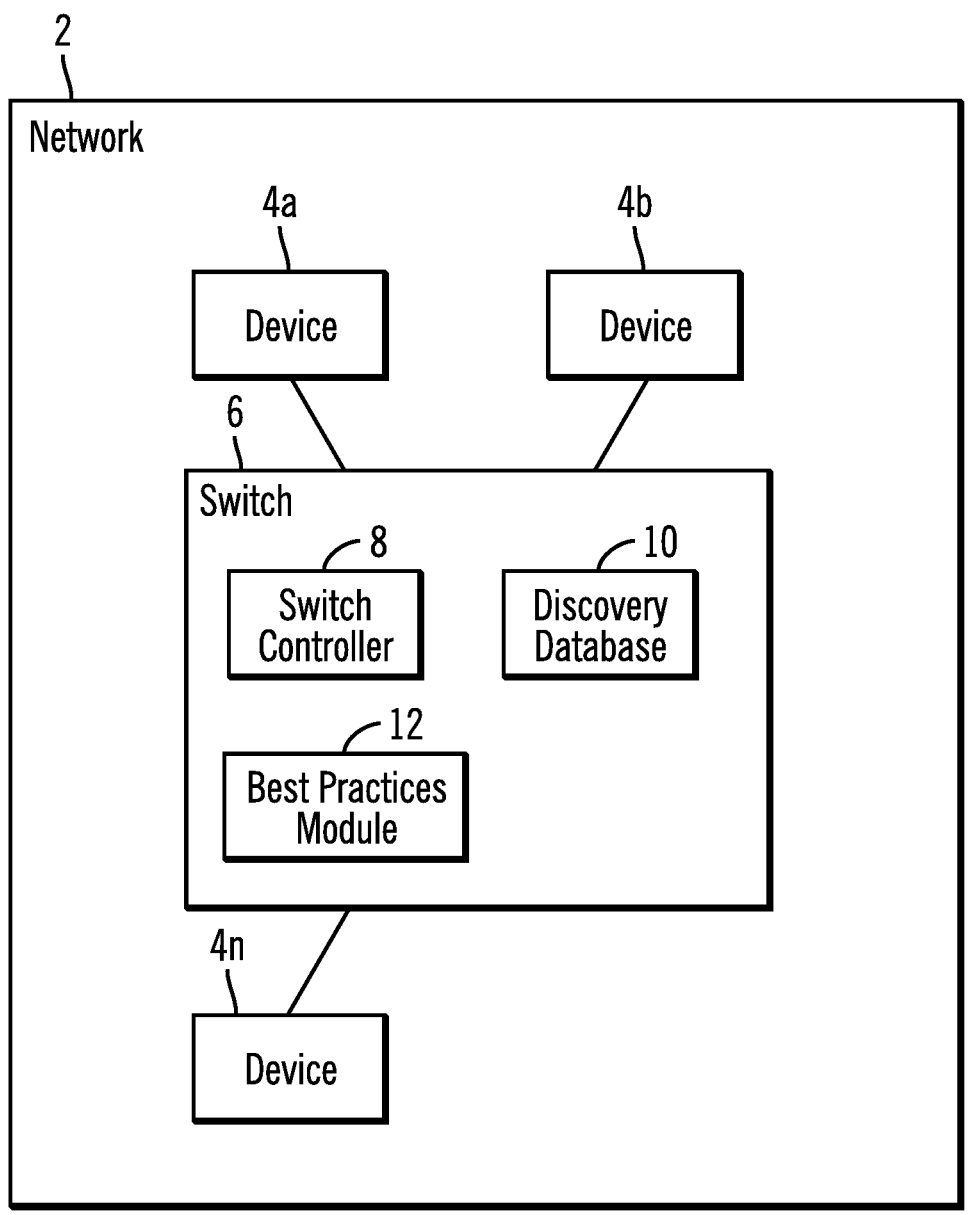
FIG. 1 illustrates an embodiment a network computing environment.

FIG. 1 illustrates an embodiment of a network computing environment 2 having components including a plurality of devices 4a, 4b . . . 4n that connect to one another via a switch 6. The network 2 may include additional switches 2 and devices 4a, 4b . . . 4n, where switches may connect to each other and to the devices 4a, 4b . . . 4n in the network 2. The devices 4a, 4b . . . 4n may comprise hosts, initiators, targets, storage devices, etc. The switches 6 includes a switch controller 8 to perform switch 6 operations and a discovery database 10 including information on components, including devices 4a, 4b . . . 4n and other switches 6, discovered in the network 2 as a result of device discovery operations. The discovery database 10 further includes information on zones in which the components, including devices 4a, 4b . . . 4n and switches 7, are configured. In one embodiment, the switch 6 may include a best practices module 12 that performs a best practices check of the configuration of the devices 4a, 4b . . . 4n in the network 2 to determine if the configuration of zones and components satisfy requirements of best practices rules for the network 2. In a further embodiment, the best practices module 12 may be implemented in a device 4a, 4b . . . 4n, such as a standalone device. The components 4a, 4b . . . 4n, 6 in the network 2 may be from a single vendor or multiple vendors.

The network 2 may comprise a network such as a Local Area Network (LAN), Storage Area Network (SAN), Wide Area Network (WAN), peer-to-peer network, wireless network, etc. In SAN embodiments, the switch 6 and each of the devices 4a, 4b . . . 4n include Fibre Channel adaptors to communicate in the network 2.

Figure 2:
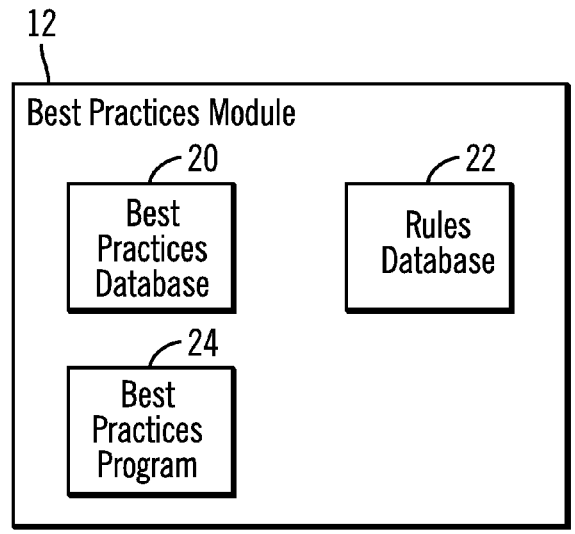
FIG. 2 illustrates an embodiment of a best practices module.

FIG. 2 illustrates an embodiment of the best practices module 12 to perform a best practices analysis of components 4a, 4b ... 4n, 6 in the network 2. The module 12 includes a best practices database 20 having information on components 4a, 4b ... 4n and 6 in the network 2 and zones in which the components are included. The best practices module 12 may obtain information on the configuration of zones and components from the switch 6 discovery database 10. The best practices rules in the rules database 22 may comprise rules provide by different vendors or generic industry standard rules. The best practices module 12 may access from over a network or from the network components 4a, 4b ... 4n, 6 best practices rules from vendors supplying the components so that the best practices rules database 22 may be updated with a most current set of rules. Component vendors may follow industry standard guidelines for a format of the rules, such as an Extensible Markup Language (XML) format, to allow easy integration of the rules into a rules database 22. The best practices program 24 performs the best practice analysis and other related operations in the network 2. The best practices program 24 performs the best practices analysis with respect to component and zone configuration information maintained in the best practices database 20 and the best practices rules maintained in the rules database 22.

In one embodiment, the best practices module 12 is implemented within one or more switches 6 in the network 2. In an alternative embodiment, the best practices module 12 may be implemented in a device 4a, 4b ... 4n coupled to the switch. The best practices module 12 may comprise a standalone device that connects to one or more switches 6 in the network 2.

Figure 3:
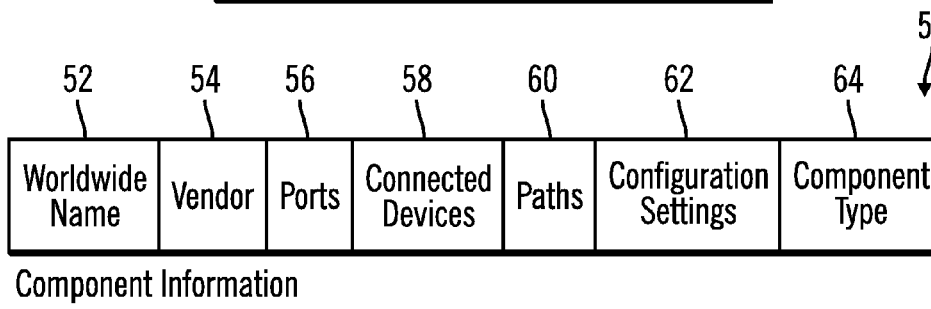
FIG. 3 illustrates an embodiment of component information.

FIG. 3 illustrates an embodiment of component information 50 maintained in the best practices database 20 for components 4a, 4b ... 4n, 6 in the network 2, including: a unique worldwide name (WWN) 52 of the component; a vendor 54 of the component 52;

ports 56 included in the component 52; connected devices 58 connected to the ports 56 of the component 52; paths 60 configured between the ports 56 of the component 52 and the connected devices 58; configuration settings 62 within the component, such as encryption settings, traffic isolation settings, vendor specific settings, quality of service settings, etc.; and a component type 64 indicating the type of the component, e.g., switch, initiator, target, host, storage, etc. Both the discovery database 10 and best practices database 20 may maintain some or all of the component information as shown in FIG. 3.

Figure 4:
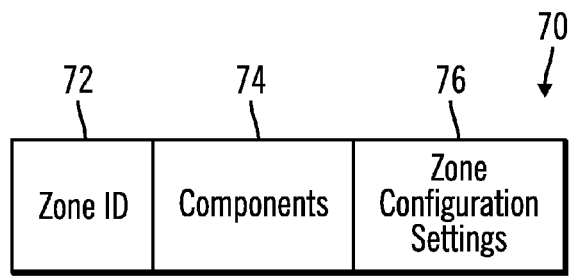
FIG. 4 illustrates an embodiment of zone information.

FIG. 4 illustrates an embodiment of zone information 70 a maintained in the best practices database 20 for each zone configured in the network 2, including: a zone identifier (ID) 72; components included in the zone 72; and zone configuration settings 74.

Figure 5:
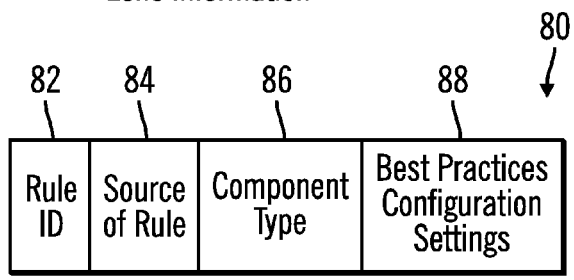
FIG. 5 illustrates an embodiment of a best practices rule.

FIG. 5 illustrates an embodiment of a best practices rule 80 in the rules database 22, which includes a rule identifier (ID) 82; a source of the rule 84, which may identify a vendor that provided the rule for its components or identify the rule as a common industry standard rule; a component type 86 identifying the type of component, e.g., switch, initiator, target, storage device, etc., to which the rule applies; and best practices configuration settings 88 provided by the rule. The rules database 22 may include from a vendor one or more rules for each component 4a, 4b ... 4n, 6 type in the network 2 supplied by that vendor and one or more rules for zones configured in which the components of the vendor are configured.

Figure 6:
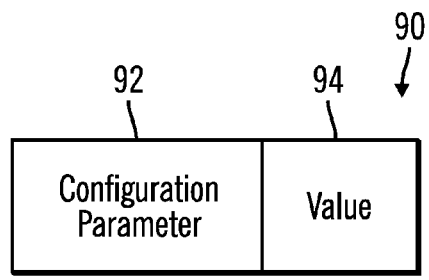
FIG. 6 illustrates an embodiment of a configuration setting.

FIG. 6 illustrates an embodiment of a configuration setting 90 including a configuration parameter 92 and a value 94 for the parameter 92.

Figure 7:
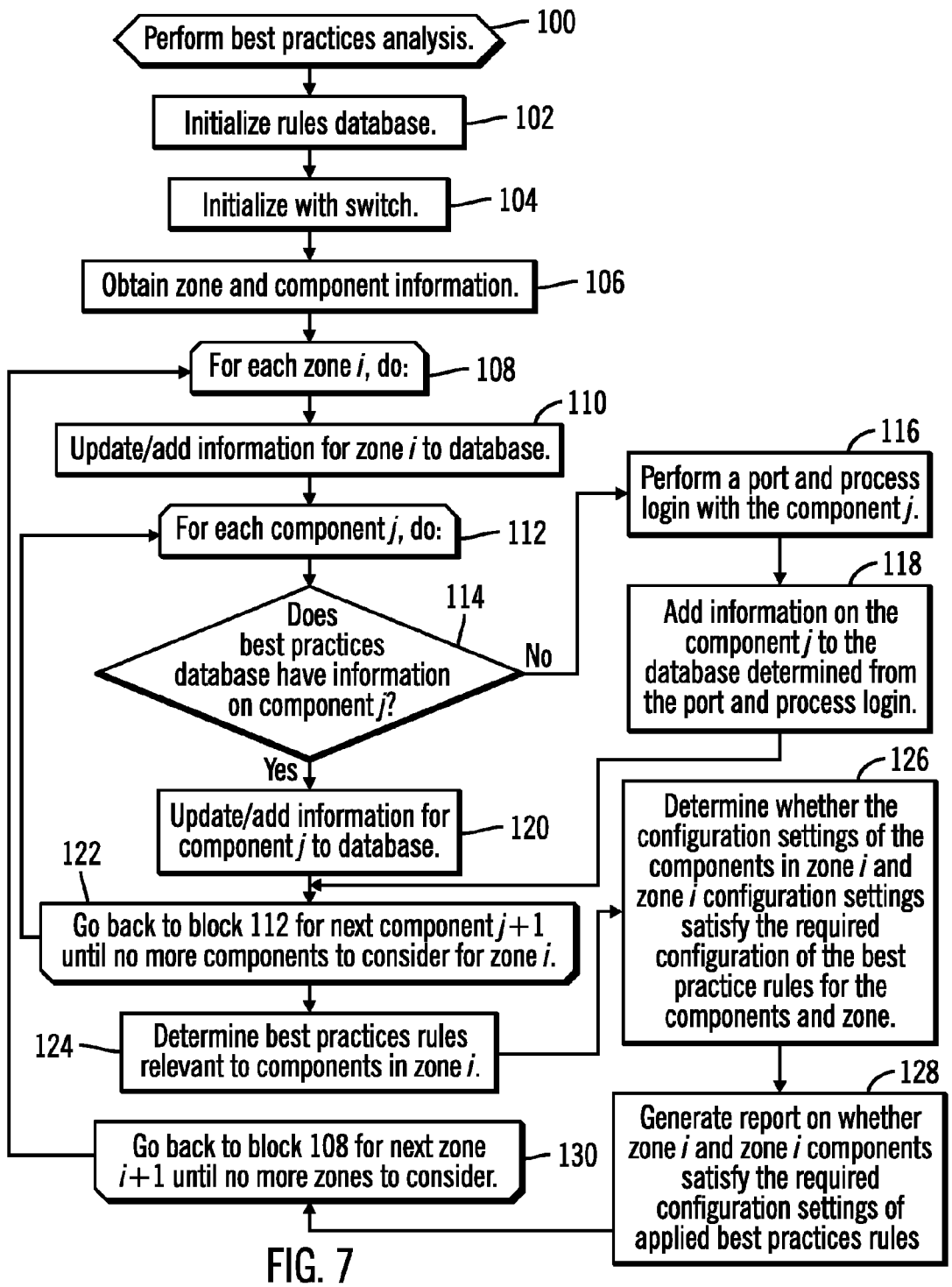
FIG. 7 illustrates an embodiment of operations to perform a best practices analysis.

FIG. 7 illustrates an embodiment of operations performed by the best practices program 24 to perform best practices analysis of the network 2. Upon initiating (at block 100) best practices analysis, the best practices program 24 initializes (at block 102) the rules database 22 to include rules for all vendors whose components 4a, 4b ... 4n, 6 are included in the network 2. The best practices program 24 initializes (at block 104) with the switch 6. In embodiments where the best practices module 12 is embedded within the switch 6, the initialization comprises the switch 6 loading and executing the best practices program 24, which has access to components in the switch 6 such as the discovery database 10 and notifications of component and zone changes received by the switch 6. In embodiments, where the best practices module 12 is located in a device 4a, 4b ... 4n external to the switch 6, the best practices module 12 must perform a login with the switch. In SAN and Fibre Channel embodiments, the login may involve a flogi, plogi to name server, plogi to a management server in the switch 6, etc. For a LAN embodiment, the best practices module 12 may perform a Simple Network Management Protocol (SNMP) query such as a SNMP Get command to obtain the necessary device specific information The best practices program 24 obtains (at block 106) zone and component 4a, 4b ... 4n, 6 information from the discovery database 10 of the switch 6. In embodiments where the best practices module 12 is embedded within the switch 6, the best practices program 24 will have access to the zone and component information in the discovery database 10. In embodiments, where the best practices module 12 is located in a device 4a, 4b ... 4n external to the switch 6, the switch 6 may support a command to allow the best practices program 24 to query the switch 6 discovery database 10 for zone and component information.

The best practices program 24 may then update the best practices database 20 with the component and zone information obtained from the discovery database 10, including the component information 50 (FIG. 3) and zone information 70 (FIG. 4) as obtained from the discovery database 10. The operations of blocks 108 through 130 provide an embodiment of operations the best practices program 24 may execute to update the best practices database 20 using a combination of zone information 70, accessed component information 50, and information obtained by querying components 4a, 4b ... 4n, 6 in the network 2. For each zone i indicated in the determined zone information 70 obtained from the discovery database 10 (at block 108 through 130), the best practices program 24 updates/adds (at block 110) zone information 70 (FIG. 4) for zone i to the best practices database 20. In an alternative embodiment, the best practices program 24 may update the best practices database 20 with component 50 and zone 70 information from the discovery database 10 and with information obtained by directly querying components 4a, 4b ... 4n, 6 in the network 2.

The best practices program 12 performs the operations at block 112 through 122 for each component j, e.g., 4a, 4b ... 4n, 6, included in zone i, such as indicated in the components 74 information of the zone information 70 (FIG. 4). If (at block 114) the best practices database 20 does not have component information 50 on component j, then the best practices program 24 performs (at block 116) a port and process login with the component j and adds (at block 118) gathered information on the component j to the best practices database 20 as determined from the port and process login. In SAN embodiments where the best practices module 12 is embedded within the switch 6, the best practices program 24 may login to the component 4a, 4b ... 4n, 6 using a source address of the component and a domain ID. In SAN embodiments, where the best practices module 12 is located in a device external to the switch 6, the best practices module 12 performs the login using a normal N port ID. The best practices program 24 may further issue commands, such as SCSI (Small Computer System Interface) commands, to obtain information from the component, such as a SCSI command to report Logical Unit Numbers (LUNs) or an inquiry as to all possible LUNs.

If (at block 114) the best practices database 20 does have component information 50 for component j, then the best practices program 24 update/adds (at block 120) information for component j to the best practices database 20. From block 118 or 120, control proceeds (at block 122) back to block 112 for the next component j+1 until all components for zone i are considered.

To perform the best practices analysis, the best practices program 24 determines (at block 124) from the rules database 22 best practices rules 80 relevant to the components 4a, 4b . . . 4n, 6 in zone i. These may comprise rules 80 for vendors and component types 84 (FIG. 4) matching the vendors 54 and component types 64 (FIG. 3) of components 50 in the zone i indicated in the best practices database 20. The best practices program 24 determines (at block 126) whether the configuration settings of the components 4a, 4b . . . 4n, 6 in zone i and the zone configuration settings 76 of zone i satisfy the best practices configuration settings 88 of the best practice rules 80 relevant to the components in zone i and the zone i configuration settings 76 (FIG. 4). The best practices program 24 then generates (at block 128) report on whether zone i and zone i components satisfy the best practices configuration settings 88 of the applied best practices rules 80. This report may be displayed, emailed, printed or otherwise communicated to an administrator of the network 2 to take corrective action. In one embodiment, the best practices program 24 may automatically reconfigure the component settings and zone i configuration settings to conform to settings indicated in the applied best practices rules 80 for those zone i and component configuration settings that were found not to conform to the applied best practices rules. After generating the report, the best practices program 24 proceeds (at block 130) back to block 108 for the next zone (i+1) until there are no further zones to consider.

Figure 8:
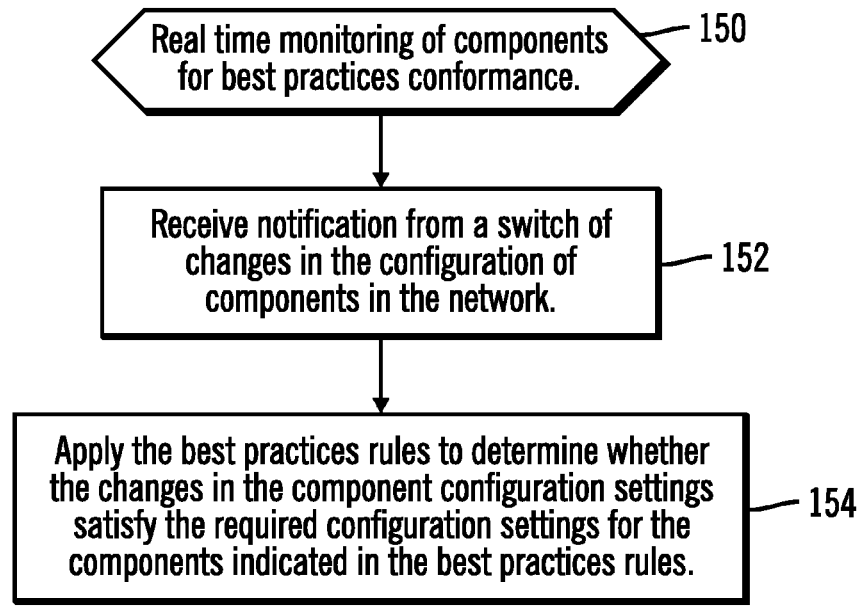
FIG. 8 illustrates an embodiment of operations for real time monitoring of components for best practices conformance.

FIG. 8 illustrates an embodiment of operations performed by the best practices program 24 for real time monitoring of components 4a, 4b . . . 4n, 6 in the network 2. The best practices program 24 may perform real time monitoring (at block 150) by receiving (at block 152) notification from a switch 6 of changes in the configuration of components in the network 2. The best practices program 24 embedded in the switch 6 may have access to the change notifications the switch 6 receives from the attached components. In embodiments where the best practices module 12 is located in a device 4a, 4b . . . 4n external to the switch 6, the switch 6 may forward real time component change notifications to the best practices module 12. The best practices module 12 applies (at block 154) best practices rules 80 to determine whether the changes in the configuration settings satisfy the best practices configuration settings for the components indicated in the best practices rules 80.

Figure 9:
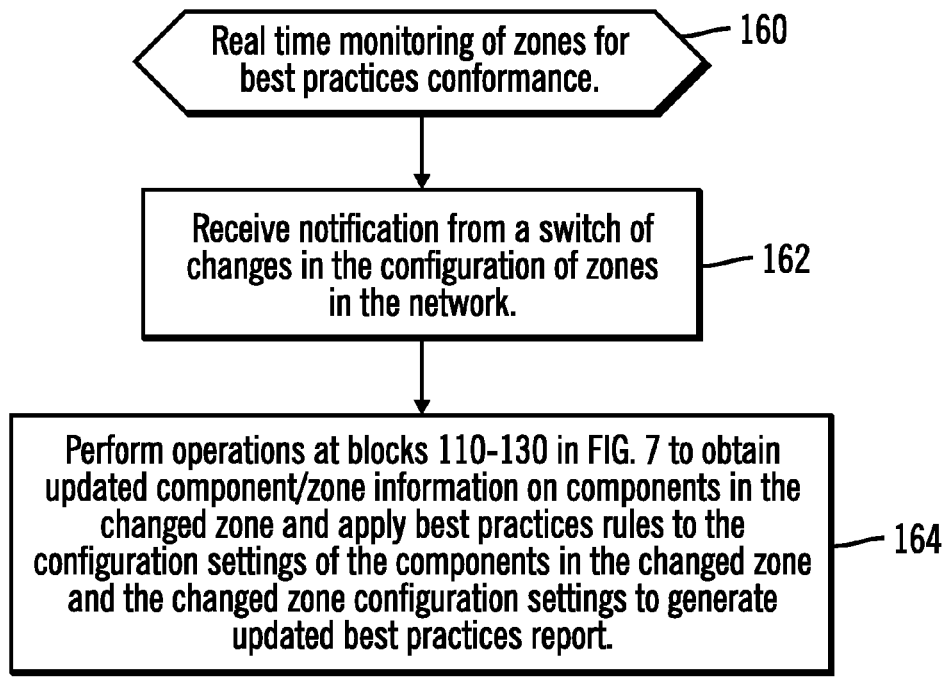
FIG. 9 illustrates an embodiment of operations for real time monitoring of zones for best practices conformance.

FIG. 9 illustrates an embodiment of operations performed by the best practices program 24 for real time monitoring of changes to zones in the network 2. Upon performing real time monitoring of zones (at block 160), the best practices program 24 receives (at block 162) notification from a switch 6 of changes in the configuration of a zone in the network 2. The best practices program 24 performs (at block 164) the operations at blocks 110 to 130 in FIG. 7 to obtain updated component/zone information on components in the changed zone to apply best practices rules to the configuration settings of the components in the changed zone and the changed zone configuration settings to generate an updated best practices report based on the real time notification of changes to the zone and/or components in the changed zone.

Figure 10:
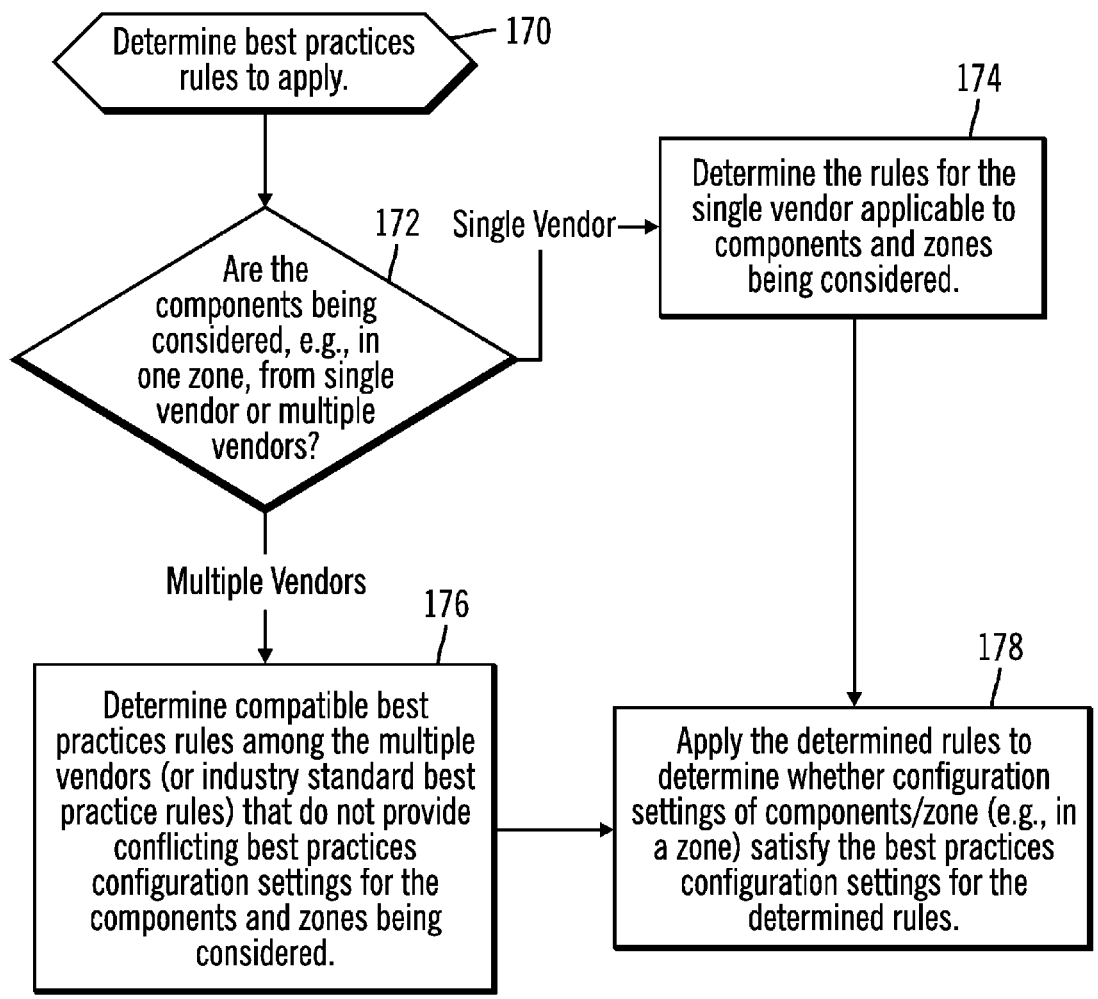
FIG. 10 illustrates an embodiment of operations to determine best practices rules to apply.

FIG. 10 illustrates an embodiment of operations performed by the best practices program 24 to determine best practices rules 80 in the rules database 22 to apply to the settings of components and zones in the network 2. The operations of FIG. 10 may be performed at block 124 in FIG. 7. Upon initiating (at block 170) the operation to apply the best practices rules 22, the best practices program 24 determines (at bloc 172) whether the components being considered, e.g., in one zone, are from a single vendor or multiple vendors. If the components are from a single vendor, as indicated in the vendor field 54 (FIG. 3) of the components, then the best practices program 24 determines (at block 174) the best practices rules 80 for the single vendor applicable to the components and zones being considered. The best practices rules 80 have the source field 84 and the component type 86 matching thee vendor 54 and component type 64 of the components and zones being considered. If (at block 172) the components to consider are from multiple vendors, as indicated in the vendor field 54 (FIG. 3) of the components, then the best practices program 24 determines (at block 176) best practices rules common among the multiple vendors (or industry standard best practice rules) that do not provide conflicting best practices configuration settings 88 for the components 4a, 4b . . . 4n, 6 and zones being considered. After determining the rules 80 to apply to the components being considered at blocks 174 and 176, the best practices program 24 applies (at block 178) the determined rules 80 to determine whether configuration settings 62 of the components and the zone 76 satisfy the best practices configuration settings 88 of the applied rules 80.

Figure 11:
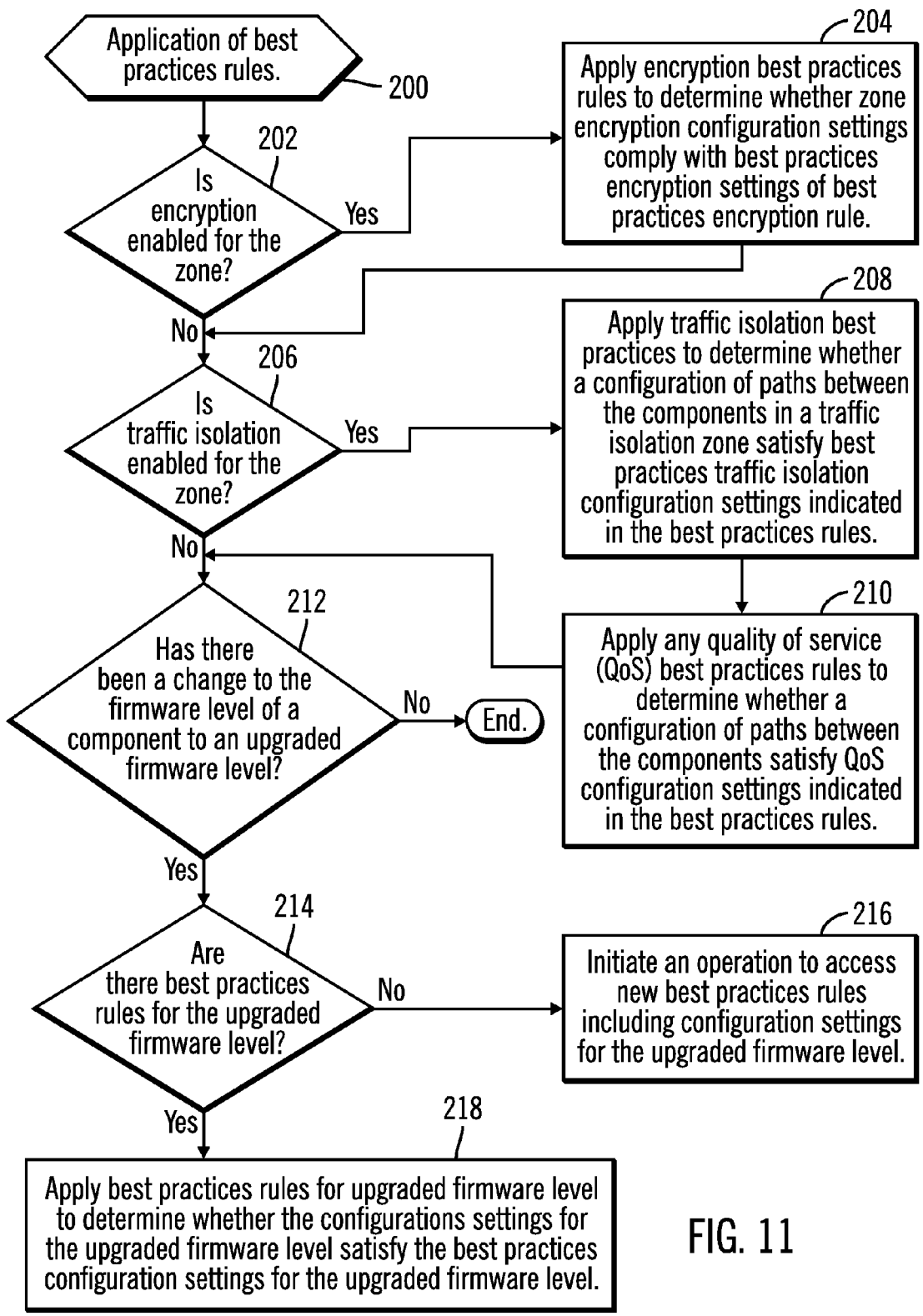
FIG. 11 illustrates an embodiment of operations to apply best practices.

FIG. 11 illustrates an embodiment of operations performed by the best practices program 24 to apply the best practices rules 80 in the rules database 22 to configuration settings of components 62 and zones 76 in the network 2 being considered. The rules 80 to apply may be determined from the operations in FIG. 10. The operations of FIG. 11 may be performed at block 126 in FIG. 7. The rules 80 being applied in FIG. 11 include zone encryption rules, traffic isolation zone rules, and component firmware setting rules. Upon initiating (at bock 200) operations, the best practices program 24 determines (at block 202) whether encryption is enabled. If (at block 202) encryption is enabled, then the best practices program 24 applies (at block 204) the encryption best practices rules to determine whether zone encryption configuration settings comply with best practices encryption settings of an encryption best practices rule. For instance, there may be certain encryption requirements in zones, such that initiator and targets need to direct communications to another device for encryption, and the best practices analysis determines whether these rules are being satisfies, such as communications are forwarded to the encryption device. The next rule to consider is a traffic isolation rule for the zones being considered, where paths are configured for specific initiators and targets and there may be failover and other setting requirements. If (at block 206), traffic isolation is enabled for the zone, then the best practices program 24 applies (at block 208) traffic isolation best practices to determine whether a configuration of paths between the at least one imitator and target in a traffic isolation zone satisfy best practices traffic isolation configuration settings indicated in the best practices rules. There may also be quality of service requirements specifying that a certain number of paths be dedicated to certain targets and initiators. In such case, the best practices program 24 applies (at block 210) any quality of service (QoS) best practices rules to determine whether a configuration of paths between components, such as initiators and targets, satisfy best practices quality of service configuration settings indicated in the best practices rules.

The best practices program 24 may further determine (at block 212) whether there has been a change to a firmware level of a component to an upgraded firmware level. If so and if (at block 214) there are best practices rules 22 directed to the upgraded firmware level, as indicated in the configuration type 86 and settings 88, then the best practices program 24 applies (at block 218) the best practices rules 80 for the upgraded firmware level to determine whether the configurations settings for the upgraded firmware level satisfy the best practices configuration settings 88 for the upgraded firmware level. If (at block 214) there are no best practices rules 80 in the rules database 22 that concern the upgraded firmware level, then the best practices program 24 may initiate (at block 216) an operation to access new best practices rules 80 including configuration 96 settings for the upgraded firmware level and then apply (at block 218) any newly accessed best practices rules for the upgraded configuration settings.

The above operations concern best practices analysis for an encryption zone, traffic isolation zone, and component firmware. However, additional or alternative best practices analysis operations may be performed with respect to other zone types and components than those described above.

Described embodiments provide techniques for discovering components and zones in a network and their configuration settings and then applying best practices rules to determine whether configuration settings for the zones and components in the network satisfy best practices configuration settings of applicable best practices rules. Described embodiments may provide rules from a single vendor when the network has components from a single vendor, apply best practices rules from multiple vendors when the network has components from multiple vendors, and apply industry standard best practices rules. Described embodiments automatically determine whether the configuration of components and zones in the network satisfy the most relevant best practices. This allows the system administrator to ensure that the components and zones follow the most relevant best practices to avoid network problems and errors that may result when the network configuration deviates from vendor and industry standard best practices.

Cloud Computing Environment

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 12-14. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
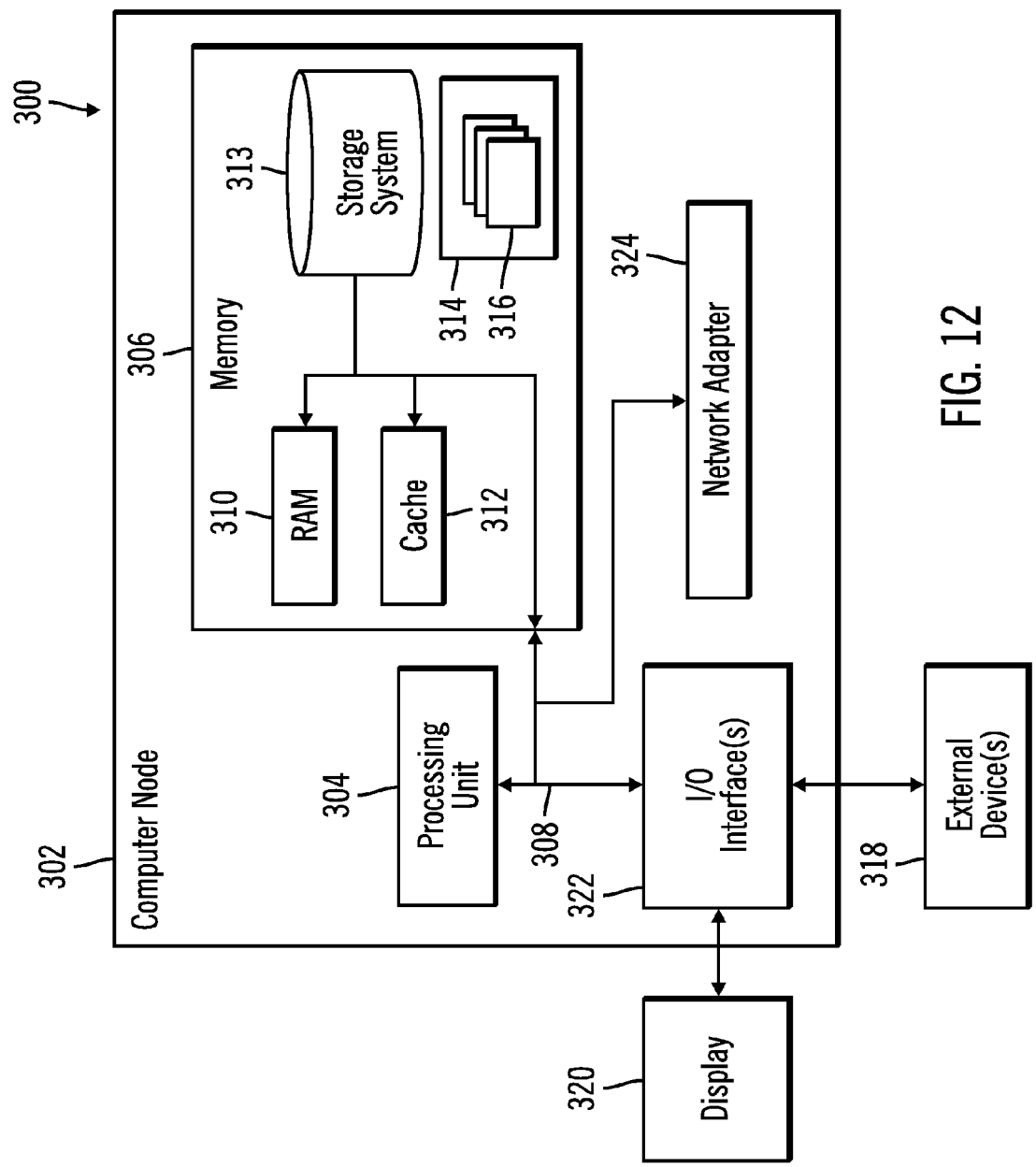
FIG. 12 illustrates an implementation of a node in the network computing embodiment.

FIG. 12 illustrates an embodiment of a cloud computing node 300 which may comprise an implementation of the components 4a, 4b . . . 4n and 6 in the network 2, where the components may be implemented in one or more of the nodes 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), Storage Area Network (SAN), a general wide area network (WAN), and/or a public network (e.g., the Internet) via network adapter 324. As depicted, network adapter 324 communicates with the other components of computer system/server 302 via bus 308. The network adaptor 324 comprises hardware and program code implementing a particular network protocol, such as Ethernet, Fibre Channel, etc. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 13:
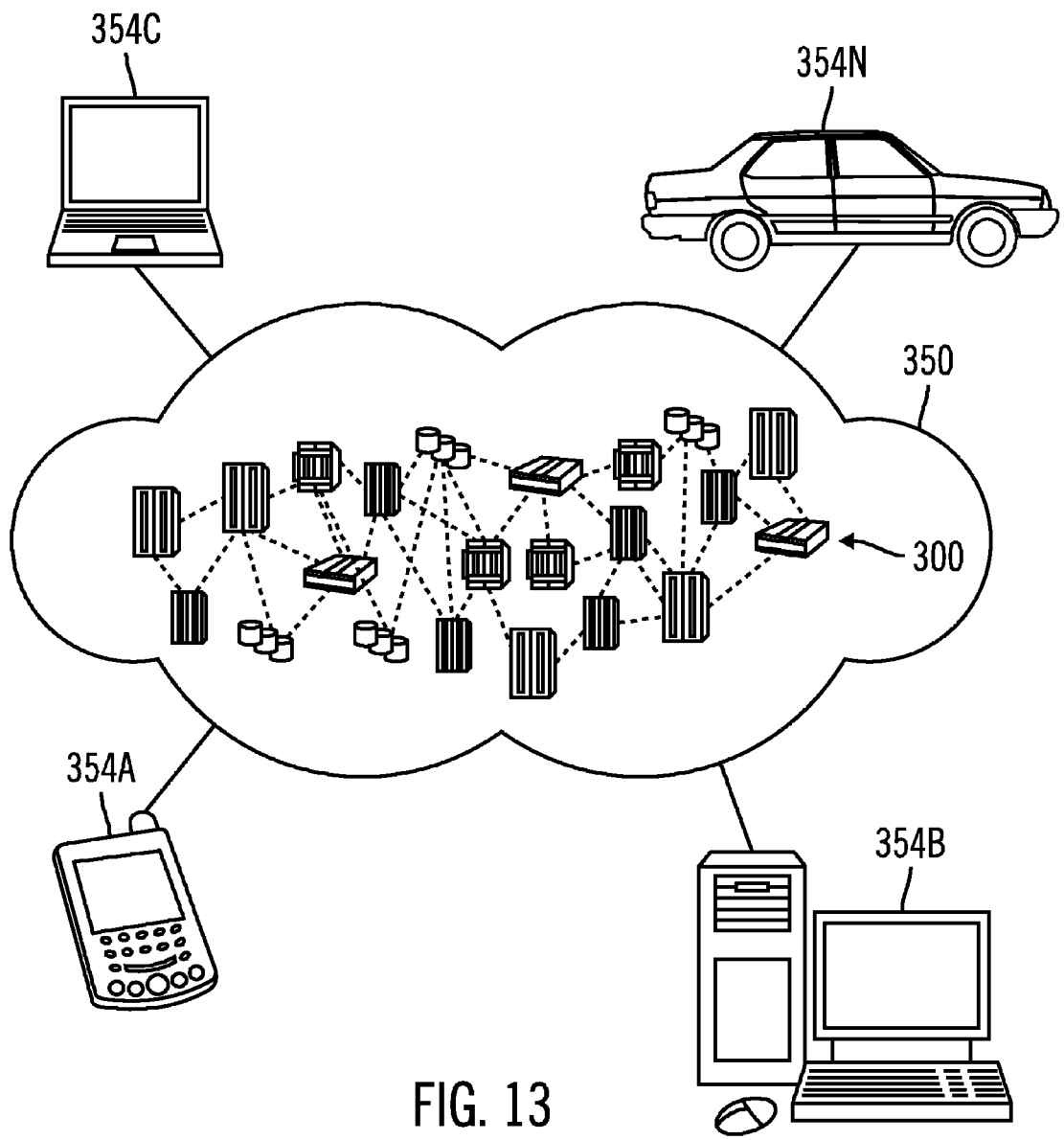
FIG. 13 illustrates an embodiment of a cloud computing environment.

Referring now to FIG. 13, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 13 are intended to be illustrative only and that computing nodes 300 and cloud computing environment 350 can communicate with any type of computerized device over any type of network and/or network addressable connection (e.g., using a web browser).

Figure 14:
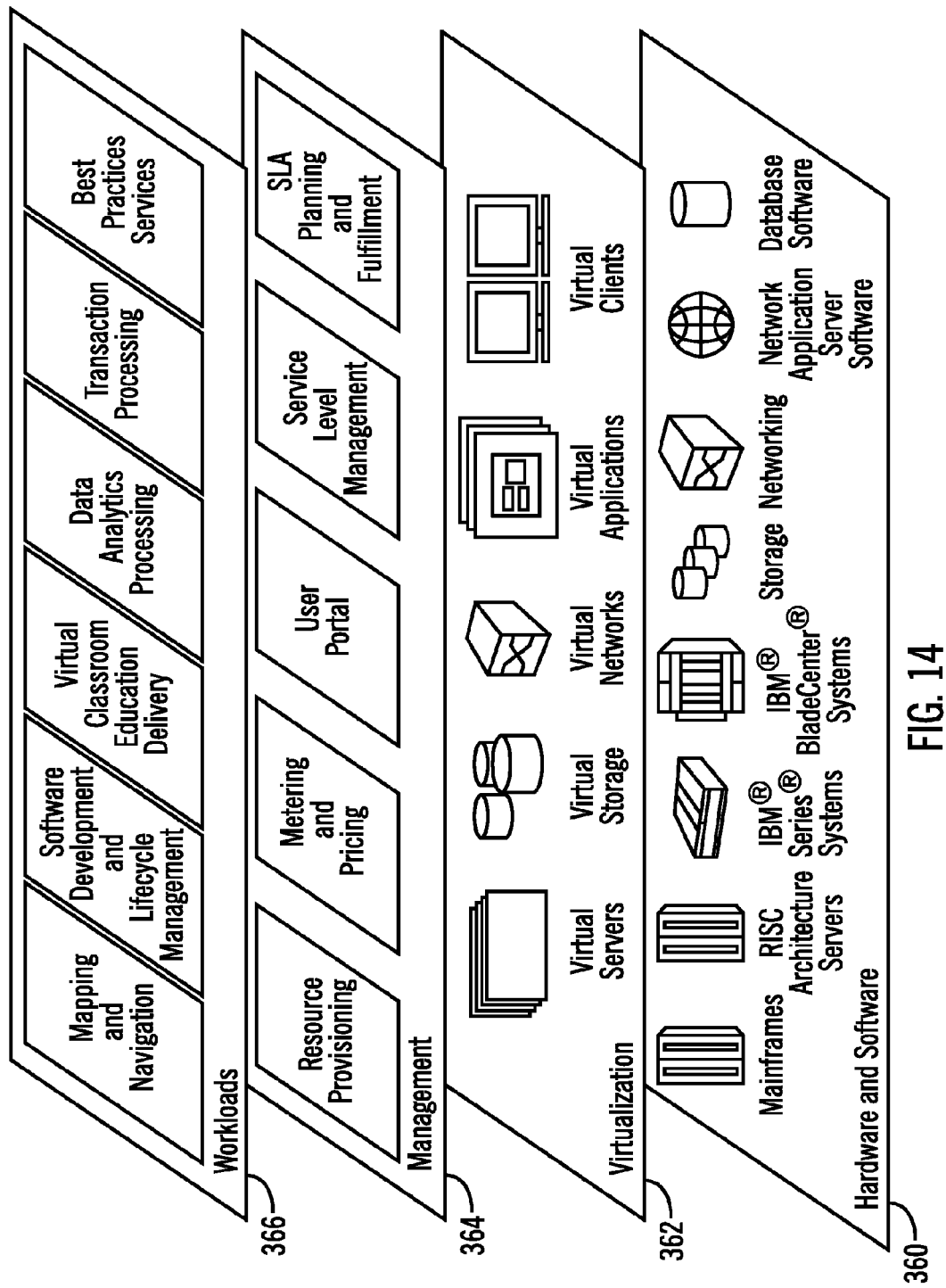
FIG. 14 illustrates an embodiment of abstraction model layers of a cloud computing environment.

Referring now to FIG. 14, a set of functional abstraction layers provided by the cloud computing environment 350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the best practices services, such as described with respect to FIGS. 1-11, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7-11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    providing a database in a computer readable storage medium having information on components in the network and configuration settings for the components, wherein the database includes information on zones in which the components are included;
    for each zone indicated in the database and for each component in each zone, perform:
        determining whether the database has information on the component;
        performing a port and process login with the component in response to determining that the database does not have information on the component;
        adding information on the component to the database determined from the port and process login;
        accessing best practices rules in the computer readable storage medium indicating best practices configuration settings for the component in the network,
    wherein the best practices rules provide best practices configuration settings for zones;
        processing the database and the accessed best practices rules to determine whether the configuration settings for the component in the zone satisfies the best practices configuration settings for the component indicated in the best practices rules; and
    generating a report indicating whether the configuration settings of the components in the network satisfy the best practices configuration settings for the components indicated in the best practices rules.

2. The method of claim 1, wherein the operations further comprise:
    receiving notification from a switch of changes to one of the zones in the network;
    updating the database to indicate the changes in the zone configuration settings; and
    applying the best practices rules to determine whether the changes in the zone configuration settings satisfy the best practices configuration settings for the zones indicated in the best practices rules.

3. The method of claim 1, wherein the operations further comprise:
    receiving notification from a switch of changes in the configuration of components in the network;

updating the database to indicate the changes in the configuration of the components; and applying the best practices rules to determine whether the changes in the component configuration settings satisfy the best practices configuration settings for the components indicated in the best practices rules.

4. The method of claim 3, wherein the computer storage medium is implemented in the switch, and wherein the notifications are received in response to the switch receiving the notifications.

5. The method of claim 1, wherein the computer storage medium is implemented in a component connected to a switch, further comprising:

periodically querying the switch to obtain information on the components, zones in which the components are included, and the configuration of the components in the network to include in the database.

6. A method, comprising:

generating a database having information on components in a network and configuration settings for the components;

accessing best practices rules indicating best practices configuration settings for the components in the network;

determining whether the components in the network are from a single vendor or multiple vendors;

in response to determining that the components in the network are from the single vendor, using vendor specific best practices rules of the accessed best practices rules to determine whether the configuration settings for the components satisfy the best practices configuration settings for the components indicated in the vendor specific best practices rules;

in response to determining that the components in the network are from the multiple vendors, determining compatible best practices rules from the multiple vendors that do not provide conflicting best practices configuration settings;

using the determined compatible best practices rules from the multiple vendors to determine whether the configuration settings for the components satisfy the best practices configuration settings indicated in the determined compatible best practices rules; and generating a report indicating whether the configuration settings of the components in the network satisfy the best practices configuration settings for the components indicated in the best practices rules.

7. A method, comprising:

generating a database having information on components in a network and configuration settings for the components;

accessing best practices rules indicating best practices configuration settings for the components in the network;

determining whether encryption is enabled for at least one of the components in the network;

determining whether encryption settings for the components in the network indicated in the database satisfy best practices encryption configuration settings indicated in the best practices rules; and generating a report indicating whether the configuration settings of the components in the network satisfy the best practices configuration settings for the components indicated in the best practices rules.

8. A method, comprising:

generating a database having information on components in a network and configuration settings for the components;

accessing best practices rules indicating best practices configuration settings for components in the network;

determining whether traffic isolation is enabled for components in the network;

determining whether a configuration of paths between the components in a traffic isolation zone satisfy best practices traffic isolation configuration settings indicated in the best practices rules; and generating a report indicating whether the configuration settings of the components in the network satisfy the best practices configuration settings for the components indicated in the best practices rules.

9. The method of claim 8, wherein the best practices traffic isolation configuration settings in the best practices rules include quality of service requirements for paths configured between the components, wherein determining whether the configuration of the paths satisfy the best practices traffic isolation configuration settings indicated in the best practices rules comprises:

determining whether configuration settings for at least one path configured between the specified components satisfies the quality of service requirements for paths configured between a specified initiator and target components.

10. A method, comprising:

generating a database having information on components in a network and configuration settings for the components;

accessing best practices rules indicating best practices configuration settings for components in the network;

determining a change in a firmware level in at least one of the components in the network to an upgraded firmware level;

determining whether the best practices rules support the upgraded firmware level;

initiating an operation to access new best practices rules including configuration settings for the upgraded firmware level in response to determining that the current best practices rules do not support the upgraded firmware level; and determining whether the configurations settings for the upgraded firmware level satisfy the best practices configuration settings for the upgraded firmware level in the best practices rules in response to determining that the current best practices rules support the upgraded firmware level.

11. The method of claim 6, wherein the vendor specific best practices rules are provided by different vendors in a common format.

12. The method of claim 7, wherein the operation of determining whether encryption settings for the components in the network indicated in the database satisfy best practices encryption configuration settings indicated in the best practices rules is performed in response to determining that encryption is enabled.

13. The method of claim 7, wherein the determining whether the encryption settings for the components satisfy the best practices encryption configuration settings comprises determining whether zone encryption configuration settings comply with best practices encryption settings.

14. The method of claim 13, wherein the best practices encryption configuration settings indicate that initiators and targets need to direct communications to an encryption for encryption, wherein the determination of whether the encryptions settings for the components satisfy the best practices encryption configuration settings comprises determining whether communications are forwarded to the encryption device.

\* \* \* \* \*